United States Patent [19]

Rockwood et al.

[11] Patent Number: 4,572,517
[45] Date of Patent: Feb. 25, 1986

[54] LABYRINTH RING SEALS WITH HOUSING MOUNTING MEANS

[75] Inventors: Robert E. Rockwood, Windham; Richard P. Antkowiak, Hampstead, both of N.H.; Douglas J. Hill, York Beach, Me.

[73] Assignee: A. W. Chesterton Company, Stoneham, Mass.

[21] Appl. No.: 759,469

[22] Filed: Jul. 26, 1985

[51] Int. Cl.⁴ ............... F16J 15/18; F16J 15/447
[52] U.S. Cl. ............................ 277/53; 277/9; 277/194; 277/198
[58] Field of Search ................. 277/53-57, 277/192, 193, 198, 199, 194, 237, 9

[56] References Cited

U.S. PATENT DOCUMENTS

| 1,780,804 | 11/1930 | Ward | 277/53 X |
| 1,890,839 | 12/1932 | Young | 277/53 X |
| 3,961,799 | 6/1976 | Peet | 277/9 |
| 4,022,479 | 5/1977 | Orlowski | 277/53 |
| 4,114,902 | 9/1978 | Orlowski | 277/53 |
| 4,353,559 | 10/1982 | Budzich et al. | 277/53 |
| 4,423,878 | 1/1984 | Escue | 277/9 X |

FOREIGN PATENT DOCUMENTS

| 549572 | 4/1932 | Fed. Rep. of Germany | 277/194 |
| 536191 | 5/1941 | United Kingdom | 277/9 |

Primary Examiner—Robert S. Ward

[57] ABSTRACT

A ring seal comprises mating stationary and rotary sealing rings, the rotary sealing ring comprising a first portion of one diameter fitting within a first portion of the stationary ring to be mounted in an opening in a housing and a second portion of a larger diameter fitting within an enlarged portion of the stationary ring. The ring seal further comprises in combination a plurality of elastomeric mounting rings having an inner diameter adapted for mounting on the first portion of the stationary ring and having different predetermined diameters of openings in housings in which the ring seal may be mounted.

13 Claims, 6 Drawing Figures

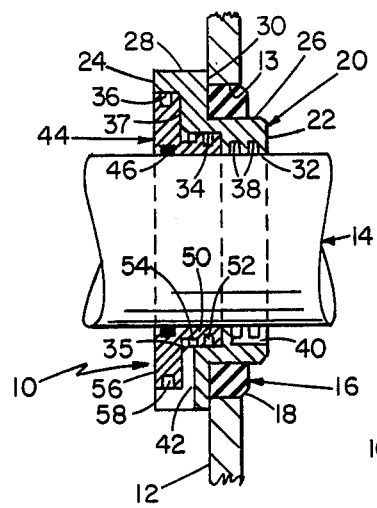
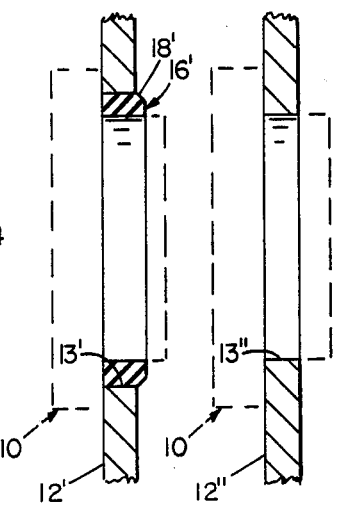
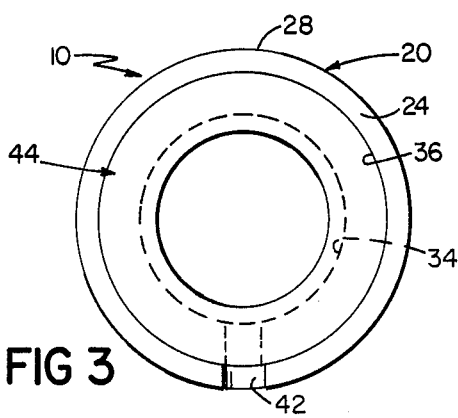
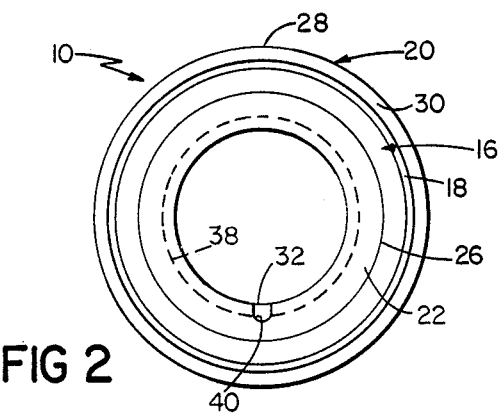
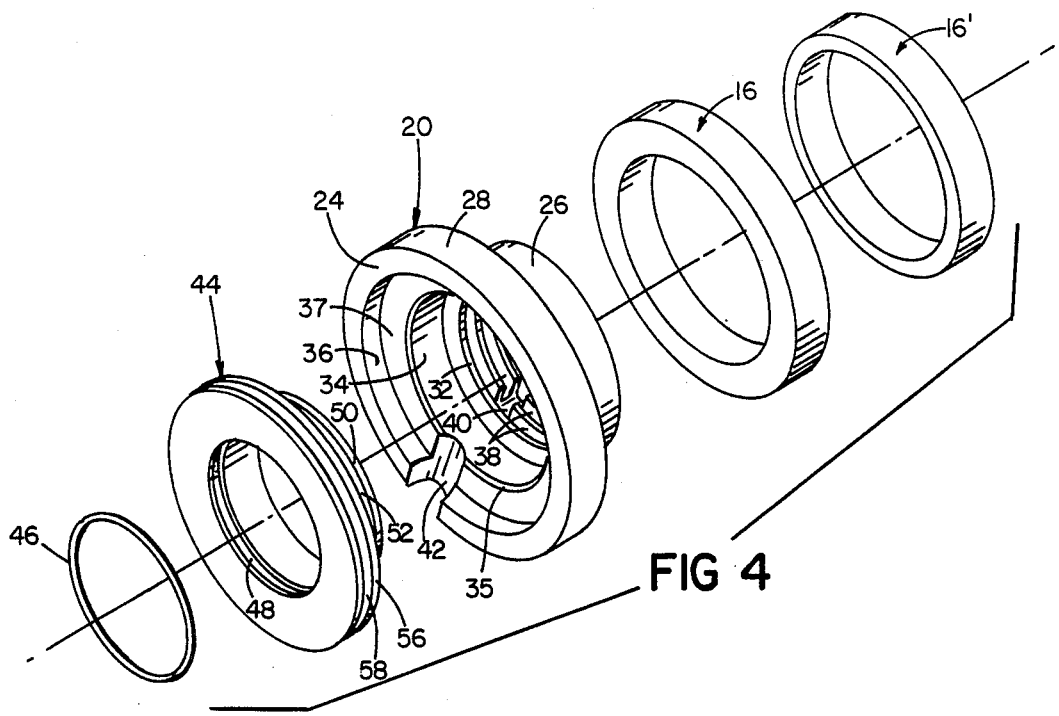

LABYRINTH RING SEALS WITH HOUSING MOUNTING MEANS

This invention relates to ring seals and more particularly to a labyrinth seal comprising a pair of relatively rotatable sealing rings for sealing a housing about a shaft.

Such ring seals are known in the art. Typically such seals are employed to seal shaft bearings in a housing containing lubricant for the bearings. U.S. Pat. Nos. 4,002,479 and 4,114,902 disclose such ring seals adapted for mounting about a shaft into an opening in a housing. A stationary sealing ring is press fitted into the housing about a shaft and has labyrinth grooves adjacent the shaft. A rotary sealing ring is mounted on the shaft and sealingly mates with the stationary seal from outside the housing. The sealing rings have radially extending walls substantially abutting about the periphery of the ring seal. The stationary sealing ring has a uniform outer diameter and rotary sealing ring has an outer diameter equal to the outer diameter of the stationary ring adjacent thereto. Typically, such sealing rings are manufactured in separate external sizes to fit different size openings in the housings even where a single shaft diameter is involved.

It is an object of the present invention to improve the joint between the stationary and rotary sealing rings to better protect against the intrusion of deleterious materials therebetween. Another object of the invention is to improve the tendency of the rotary sealing ring to expel those deleterious materials which do enter the joint. Yet another object of the invention is to adapt the seal for use with housings having openings of various predetermined sizes.

In general a ring seal according to the invention comprises stationary and rotary sealing rings. The stationary sealing ring is sized at one end to fit within a predetermined opening in a housing and has an inner wall at the one end, with a groove thereabout, closely adjacent the predetermined position of a shaft passing therethrough. At its other end the stationary ring has an enlarged diameter to receive the rotary sealing ring therewithin. The rotary sealing ring adapted for mounting on the shaft has an outer diameter substantially equal to the diameter of the stationary sealing ring inner wall and an axial length no greater than that of the inner wall. At least one groove extends about the rotary sealing ring. The rotary sealing ring is thus contained within the stationary sealing ring.

In preferred embodiments the inner walls of the stationary sealing ring and the rotary sealing ring have two corresponding sections of substantially equal diameter. The first sections have a diameter smaller than the outer diameter of the stationary sealing ring at the one end thereof and the second sections have a diameter greater than the outer diameter of the one end. The axial extent of each section of the rotary sealing ring is no greater than that of the corresponding section of the inner wall. The first section of the rotary ring additionally is provided with two grooves thereabout and the second section of the rotary sealing ring is provided with one groove thereabout. A radial groove in the other end of the stationary ring communicates with the groove in the second section of the rotary ring and with one groove in the first section thereof.

In another aspect a preferred embodiment is provided with a plurality of mounting rings adapted for mounting on the one end of the stationary ring. The mounting rings have different outer diameters to fit different sized openings in housings in which the ring seal is mounted. Preferably the stationary seal has a shoulder inwardly from the one end against which a mounting ring is positioned.

Other objects, features and advantages of the invention will be apparent to those skilled in the art from the following detailed description of a preferred embodiment, taken together with the accompanying drawings, in which:

FIG. 1 is a sectional elevation view of a ring seal according to the invention mounted in a housing about a shaft;

FIGS. 1A and 1B are sectional elevation views of housings having different size openings therein and of different means for receiving the ring seal, shown in plantom, therein;

FIG. 2 is a elevation view of the interior side (relative to the housing) of the ring seal;

FIG. 3 is an elevation view of the exterior side of the ring seal; and

FIG. 4 is an exploded view of the ring seal and of mounting gaskets therefor.

As illustrated in FIGS. 1–3, the ring seal 10 is mounted in opening 13 in a housing wall 12 about a shaft 14. The ring seal comprises a stationary sealing ring 20 and a mating rotary sealing ring 44.

Stationary sealing ring 20 has first and second end faces 22, 24 axially spaced apart and extending radially between axially extending inner and outer walls. The outer walls comprise two sections 26, 28. The first outer wall section 26, adjacent the first face 22, has an outer diameter substantially equal to the predetermined diameter of the smallest opening 13" in a housing 12" into which the ring seal is to be placed, as illustrated in FIG. 1B. The second outer wall section 28, adjacent to the second face 24, has an outer diameter greater than a predetermined diameter of the largest opening 13 in a housing 12 into which the ring seal is to be placed, as illustrated in FIG. 1. A radial wall 30 extends between wall sections 26, 28 defining a shoulder at the junction of radial wall 30 and wall section 26. Thus, the stationary sealing ring 20 can be press fitted directly into an opening 13" in a housing 12" as illustrated in FIG. 1B.

Alternatively, a plurality of mounting rings 16, 16' are provided having inner diameters permitting them to be tightly mounted on section 26 against the shoulder defined by radial wall 30. The outer diameters of mounting rings 16, 16' are selected to tightly fit different sized openings 13, 13' in housings 12, 12' as illustrated in FIGS. 1 and 1A. The outer edges of mounting rings 16, 16' away from wall 30, are provided with chamfers 18, 18' to facilitate mounting within the openings 13, 13' of housings 12, 12'. The mounting rings are made of oil resistant elastomeric material, Buna-N rubber in a preferred embodiment.

The inner wall of stationary ring 20 comprises three inner wall sections 32, 34, 36 as shown in FIGS. 1 and 4. Inner wall section 32 adjacent first face 22 has an inner diameter closely spacing the section to the position of shaft 14, a clearance of about 0.003 inch from the shaft surface being provided. A pair of grooves 38 extend about the inner circumference of wall section 32 and an axial groove 40 in wall section 32 extends from the bases of grooves 38 to the exterior of the stationary ring 20 through first face 22. Inner wall section 34 is enlarged relative to section 32 to receive a portion 50 of rotary sealing ring 44 coaxially therein, the inner diameter of section 34 being less than the outer diameter of outer wall section 26 and about 0.012 inch greater than the outer diameter of the mating portion 50 of rotary sealing ring 44 to provide clearance therebetween. The recess defined by wall section 34 extends axially into the end of stationary ring 20 defined by wall section 26 adjacent wall section 32. Wall section 36 is further enlarged, having a diameter greater than that of wall section 34 and of the outer diameter of outer wall section 26, to receive an enlarged portion 56 of the rotary sealing ring 44 in the recess defined thereby at the second face 24. The diameter of wall section 36 is about 0.012 inch greater than that of rotary ring portion 56. A radially extending groove 42, aligned on the lower side of ring 20 with groove 40, extends through wall section 36 and a portion of wall section 34 to the exterior through outer wall section 28. A chamfer 35 is provided at the juncture of wall 34 and radial wall 37, extending between walls 34 and 36.

Rotary sealing ring 44 has an inner diameter about 0.005 inch larger than the diameter of shaft 14. An O-ring 46, made of a chemical resistant fluoroelastomer, sold under the trademark Viton by E. I. DuPont De Nemours & Co., is provided in a groove 48, best shown in FIG. 4, extending about the inner circumference of ring 44. O-ring 46 seals the shaft 14 and frictionally engages the rotary sealing ring 44 to the shaft 14 for rotation therewith.

The rotary sealing ring 44 has first and second relatively reduced and enlarged diameter sections. The first or reduced section 50 has a diameter substantially equal to, i.e., about 0.012 inch smaller than, the diameter of stationary seal inner wall section 34, as mentioned above, and an axial length no greater than that of wall 34. A pair of grooves 52, 54 are provided about the circumference of the reduced section 50. Groove 52 is located at the end of section 50 adjacent stationary seal inner wall section 32 and groove 54 is located at the end of section 50 adjacent second enlarged portion 56 overlying chamfer 35 and radial groove 42 of the stationary ring. Groove 54 has a shallower depth than groove 52 because of the proximity of O-ring groove 40 and the need to maintain the structural integrity of the rotary ring.

The second or enlarged diameter section 56 of the rotary sealing ring has an axial length no greater than that of inner wall section 34 and is provided with a groove 58 extending thereabout which overlies the radial groove 42 in the stationary ring 20. As noted above the diameter of section 56 is substantially equal to, i.e., about 0.012 inch smaller than, the diameter of inner wall section 36 of the stationary ring.

The ring seal is installed by first determining the size of the opening into which it is to be fitted. If the opening 13" is the same size as the diameter of the first wall section 26 of the stationary ring, the first wall section is press fitted into the opening as in FIG. 1B. If, on the other hand, the opening is larger than the diameter of section 26, a mounting ring 16, 16' of appropriate size is selected and mounted on section 26 against radial wall 30; the stationary ring with the mounting ring thereon is then pressed into the opening 13, 13' as in FIGS. 1 and 1A. In any event, the stationary ring 20 is mounted with grooves 40, 42 located at the lowermost portion thereof. The rotary ring 44, with O-ring 46 in groove 48 is then positioned on shaft 14 within the stationary ring 20.

In operation, as shaft 14 is rotated, any material, e.g., lubricant, moving from the housing between the shaft and the stationary ring is centrifugally moved into grooves 38, draining therefrom through axial groove 40 back into the housing. Any material tending to enter the seal from outside is centrifugally expelled from groove 58 in the rotary ring 44 to inner stationary wall 36 and out through radial groove 42. Any material reaching the inner portion of the rotary seal is likewise centrifugally expelled from grooves 52, 54 and out through radial groove 42.

Advantageously, the containment of the rotary seal within the stationary seal minimizes the entry of deleterious materials into the seal from outside. To the extent foreign material does enter, however, the enlarged diameter of the portion 56 of the rotary seal applies greater centrifugal force to expel the material than does a section having a diameter sufficiently small to fit within the stationary seal at the point where it enters the housing. The provision of mounting rings on the stationary seal permits the use of a seal of one size with housings having openings of various sizes.

Other embodiments of the invention will occur to those skilled in the art which are within the scope of the following claims. For example, in one variation, in large seal rings it may be desirable to provide two O-rings in a pair of grooves on the interior of the rotary sealing ring.

We claim:

1. A ring seal, for sealing between a housing and a shaft, comprising stationary and rotary sealing rings;
   said stationary sealing ring adapted for mounting about a shaft and having an outer diameter at one end sized to fit into a housing opening of predetermined substantially equal diameter, said stationary sealing ring having an inner wall closely adjacent the predetermined position of a shaft extending therethrough, said inner wall having at least one groove about the inner circumference thereof, and said stationary sealing ring having an enlarged inner wall section at the other end thereof having an inner diameter sized to receive said rotary sealing ring therewithin; and
   said rotary sealing ring adapted for mounting on a shaft and having at least one groove about the outer circumference thereof;
   characterized in that:
   said rotary sealing ring has an outer diameter substantially equal to the inner diameter of said enlarged inner wall section of said stationary sealing ring at said other end thereof and has an axial length no greater than the axial length of said enlarged inner wall section at said other end of said stationary sealing ring;
   said rotary sealing ring being contained within said stationary sealing ring.

2. The ring seal claimed in claim 1 further characterized in that: said enlarged inner wall section comprises a first section having an inner diameter smaller than the outer diameter of said one end of said stationary sealing ring and a second section having an inner diameter greater than the outer diameter of said one end; and said rotary sealing ring comprises a first section having an outer diameter substantially equal to the inner diameter of and an axial length no greater than the axial length of said inner wall first section of said stationary sealing ring and a second section having an outer diameter greater than the outer diameter of said stationary seal one end and substantially equal to the inner diameter of and an axial length no greater than the axial length of said inner wall second section of said stationary sealing ring.

3. The ring claimed in claim 2 further characterized in that: each of said first and second sections of said rotary seal ring is provided with at least one groove about the circumference thereof.

4. The ring seal claimed in claim 3 further charcterized in that said first section of said rotary sealing ring is provided with two grooves thereabout, said second section thereof is provided with one groove thereabout, and said stationary sealing ring has a radial groove in the outer wall thereof opening to the positions therein of said groove in said second section of said rotary sealing ring and the groove thereadjacent in said first section of said rotary sealing ring.

5. The ring seal claimed in claim 1 further characterized in combination with a plurality of elastomeric mounting rings each having an inner diameter adapted to fit upon the outer diameter of said stationary sealing ring at said one end thereof and said mounting rings having different outer diameters to fit into corresponding different predetermined diameter of openings in housings in which the ring seal may be mounted.

6. The ring seal claimed in claim 5 further characterized in that the outer diameter of said stationary sealing ring at said other end is greater than at said one end and a shoulder is defined by a wall extending between said two diameters.

7. The ring seal claimed in claim 5 further characterized in that one of said mounting rings is positioned on said one end of said stationary sealing ring against said shoulder.

8. The ring seal claimed in any one of claims 5, 6, or 7 further characterized in that: said enlarged inner wall section comprises a first section having an inner diameter smaller than the outer diameter of said one end of said stationary sealing ring and a second section having an inner diameter greater than the outer diameter of said one end; and said rotary sealing ring comprises a first section having an outer diameter substantially equal to the inner diameter of and an axial length no greater than the axial length of said inner wall first section of said stationary sealing ring and a second section having an outer diameter greater than the outer diameter of said stationary seal one end and substantially equal to the inner diameter of and an axial length no greater than the axial length of said inner wall second section of said stationary sealing ring.

9. The ring claimed in claim 8 further characterized in that: each of said first and second sections of said rotary seal ring provided with at least one groove about the circumference thereof.

10. The ring seal claimed in claim 9 further characterized in that said first section of said rotary sealing ring is provided with two grooves thereabout, said second section thereof is provided with one groove thereabout, and said stationary sealing ring has a radial groove in the outer wall thereof opening to the positions therein of said groove in said second section of said rotary sealing ring and the groove thereadjacent in said first section of said rotary sealing ring.

11. A ring seal, for sealing between a housing and a shaft, comprising stationary and rotary sealing rings, characterized in that:

said stationary sealing ring has an outer diameter at one end sized to fit into a housing opening of predetermined substantially equal diameter; and further charcterized in comprising, in combination with said sealing rings, a set of elastimeric mounting rings having inner diameters sized to fit on said stationary sealing ring one end and having different outer diameters sized to fit into housing openings having different predetermined diameters.

12. The ring seal claimed in claim 11 further charcterized in that said stationary seal has a diameter at the other end thereof larger than the diameter at said one end, and a radial wall extends between said two diameters defining a shoulder therebetween.

13. The ring claimed in claim 12 further characterized in that one of said mounting rings is positioned on said one end of said stationary sealing ring against said shoulder.

* * * * *

UNITED STATES PATENT AND TRADEMARK OFFICE
CERTIFICATE OF CORRECTION

PATENT NO. : 4,572,517

DATED : February 25, 1986

INVENTOR(S) : Robert E. Rockwood, Richard P. Antkowiak, Douglas J. Hill

It is certified that error appears in the above-identified patent and that said Letters Patent are hereby corrected as shown below:

Col. 2, line 18, "plantom" should be --phantom--.

Col. 5, lines 9 and 10, "charcterized" should be --characterized--.

Col. 6, line 28, "charcterized" should be --characterized--.

Col. 6, line 29, "elastimeric" should be --elastomeric--.

Col. 6, lines 33 and 34, "charcterized" should be --characterized--.

Signed and Sealed this

Twentieth Day of May 1986

[SEAL]

Attest:

DONALD J. QUIGG

Attesting Officer

Commissioner of Patents and Trademarks